(12) United States Patent
Hirano

(10) Patent No.: US 8,173,743 B2
(45) Date of Patent: May 8, 2012

(54) SILICONE RESIN COMPOSITION

(75) Inventor: Keisuke Hirano, Ibaraki (JP)

(73) Assignee: Nitto Denko Corporation, Ibaraki-Shi (JP)

( * ) Notice: Subject to any disclaimer, the term of this patent is extended or adjusted under 35 U.S.C. 154(b) by 0 days.

(21) Appl. No.: 12/340,003

(22) Filed: Dec. 19, 2008

(65) Prior Publication Data

US 2009/0163654 A1    Jun. 25, 2009

(30) Foreign Application Priority Data

Dec. 25, 2007   (JP) ................. 2007-332712
Oct. 29, 2008   (JP) ................. 2008-278574

(51) Int. Cl.
  C08L 83/05   (2006.01)
  C08K 3/22   (2006.01)

(52) U.S. Cl. ................ 524/783; 524/847; 524/858

(58) Field of Classification Search ............. 524/430
  See application file for complete search history.

(56) References Cited

U.S. PATENT DOCUMENTS

| | | | |
|---|---|---|---|
| 4,439,239 A * | 3/1984 | Greigger et al. ......... 106/287.16 |
| 4,444,973 A | 4/1984 | Schonfelder et al. |
| 5,091,460 A * | 2/1992 | Seto et al. .................. 524/492 |
| 5,654,090 A | 8/1997 | Kayanoki |
| 5,755,867 A * | 5/1998 | Chikuni et al. ........... 106/287.16 |
| 5,993,910 A * | 11/1999 | Carre et al. ................... 427/387 |
| 6,011,123 A | 1/2000 | Kurosawa et al. |
| 6,214,416 B1 * | 4/2001 | Sakagami et al. ........... 427/387 |
| 6,231,988 B1 * | 5/2001 | Kato et al. ................... 428/447 |
| 6,410,151 B1 | 6/2002 | Kurosawa et al. |
| 6,727,337 B2 | 4/2004 | Friedrich |
| 6,818,721 B2 | 11/2004 | Zha et al. |
| 7,420,220 B2 | 9/2008 | Ueda et al. |
| 7,859,006 B2 * | 12/2010 | Kato et al. ................... 257/100 |
| 2002/0007006 A1 * | 1/2002 | Kanamori et al. ............ 524/588 |
| 2002/0086169 A1 | 7/2002 | Nakata et al. |
| 2003/0021566 A1 | 1/2003 | Shustsck et al. |
| 2003/0091838 A1 | 5/2003 | Hayashi et al. |
| 2004/0048076 A1 * | 3/2004 | Nakamura et al. ............ 428/447 |
| 2004/0062873 A1 | 4/2004 | Jung et al. |
| 2004/0188699 A1 | 9/2004 | Kameyama et al. |
| 2004/0254291 A1 | 12/2004 | Kobayashi et al. |
| 2005/0189877 A1 * | 9/2005 | Ishida ............................ 313/512 |
| 2006/0229408 A1 * | 10/2006 | Shimizu et al. ............... 524/588 |
| 2006/0243996 A1 | 11/2006 | Ueda et al. |
| 2006/0270786 A1 * | 11/2006 | Shimizu et al. ............... 524/588 |
| 2007/0069232 A1 | 3/2007 | Kameyama et al. |
| 2007/0269653 A1 * | 11/2007 | Kanamori et al. ............ 428/336 |
| 2008/0008867 A1 * | 1/2008 | Shimizu et al. ............... 428/220 |
| 2008/0188032 A1 | 8/2008 | Rantala |
| 2009/0045422 A1 | 2/2009 | Kato et al. |
| 2009/0050852 A1 | 2/2009 | Kanamori et al. |
| 2009/0091045 A1 * | 4/2009 | Tanikawa et al. ............. 257/791 |
| 2009/0140284 A1 | 6/2009 | Kurino et al. |
| 2009/0146323 A1 | 6/2009 | Katayama |

FOREIGN PATENT DOCUMENTS

| | | |
|---|---|---|
| CN | 1532938 A | 9/2004 |
| EP | 0304958 A2 | 3/1989 |
| EP | 1935921 A1 | 6/2008 |
| GB | 2067582 A | 7/1981 |
| JP | 5-111631 A | 5/1993 |
| JP | 2001-279178 A | 10/2001 |
| JP | 2004-35632 A | 2/2004 |
| JP | 2005-229048 A | 8/2005 |
| JP | 2006-324596 A | 11/2006 |
| JP | 2007-270055 A | 10/2007 |
| JP | 2007-270056 A | 10/2007 |
| JP | 2007-291324 A | 11/2007 |
| WO | WO 03/011946 A1 | 2/2003 |
| WO | WO 2007125956 A1 * | 11/2007 |
| WO | WO 2008/071850 A2 | 6/2008 |

OTHER PUBLICATIONS

Final Office Action for U.S. Appl. No. 12/488,872 mailed May 11, 2010.
Non-Final Office Action for U.S. Appl. No. 12/488,872 mailed Dec. 15, 2009.
Non-Final Office Action for U.S. Appl. No. 12/488,891 mailed Mar. 17, 2010.
Office Action in U.S. Appl. No. 12/488,891 mailed Sep. 7, 2010.

* cited by examiner

*Primary Examiner* — Robert S Loewe

(74) *Attorney, Agent, or Firm* — Birch, Stewart, Kolasch & Birch, LLP

(57) ABSTRACT

A silicone resin composition obtainable by reacting a bifunctional alkoxysilane and a trifunctional alkoxysilane in the presence of a dispersion of fine metal oxide particles. The silicone resin composition is suitably used in backlights for liquid crystal displays, traffic lights, outdoor big displays, advertisement sign boards, and the like.

6 Claims, No Drawings

SILICONE RESIN COMPOSITION

BACKGROUND OF THE INVENTION

1. Field of the Invention

The present invention relates to a silicone resin composition, a method for producing the composition, and a photosemiconductor device obtained by using the composition.

2. Discussion of the Related Art

As resins for encapsulating photosemiconductor elements, silicone resins having excellent heat resistance have been used (for example, Japanese Patent Laid-Open Nos. 2005-229048 and 2006-324596).

On the other hand, in order to improve the light-extracting efficiency, it has been desired to increase a refractive index of a resin. As a means of increasing the refractive index of the resin, dispersion of fine metal oxide particles having high refractive indices has been considered.

However, there are some disadvantages that it is difficult to disperse the fine metal oxide particles without being aggregated because the silicone resins are highly hydrophobic, and that it is difficult to obtain a transparent resin because the resulting resin becomes opaque.

SUMMARY OF THE INVENTION

An object of the present invention is to provide a silicone resin composition capable of stably dispersing fine metal oxide particles, and capable of having a high refractive index and high transparency; a method for producing the composition; and a photosemiconductor device comprising a photosemiconductor element encapsulated with the composition.

These and other objects of the present invention will be apparent from the following description.

Specifically, the gist of the present invention relates to:

[1] a silicone resin composition obtainable by reacting a bifunctional alkoxysilane and a trifunctional alkoxysilane in the presence of a dispersion of fine metal oxide particles;

[2] a method for producing a silicone resin composition, including the step of reacting a bifunctional alkoxysilane and a trifunctional alkoxysilane in the presence of a dispersion of fine metal oxide particles; and

[3] a photosemiconductor device containing a photosemiconductor element encapsulated with the silicone resin composition as defined in the above [1].

The silicone resin composition of the present invention exhibits excellent effects that the silicone resin composition can stably disperse fine metal oxide particles, thereby making possible to have a high refractive index and high transparency. In addition, the photosemiconductor element is encapsulated with the resin composition, so that the photosemiconductor device can be provided with excellent light-extracting efficiency.

DETAILED DESCRIPTION OF THE INVENTION

One of the features of the silicone resin composition of the present invention resides in that the silicone resin composition is obtainable by reacting a bifunctional alkoxysilane and a trifunctional alkoxysilane in the presence of a dispersion of fine metal oxide particles, so that the silicone resin composition contains a reaction residue unit for a bifunctional alkoxysilane, a reaction residue unit for a trifunctional alkoxysilane, and fine metal oxide particles. The term "reaction residue unit" as used herein means a unit introduced into a resin obtained on the basis of the reaction of the alkoxysilanes and the fine metal oxide particles.

The silicone resin composition is obtained by reacting each of the bifunctional alkoxysilane and the trifunctional alkoxysilane and the surface of the fine metal oxide particles, and at the same time polymerizing; therefore, when used for encapsulation, it is considered that the fine metal oxide particles have excellent dispersibility, thereby making it possible to have a high refractive index and high transparency.

The fine metal oxide particles usable in the silicone resin composition of the present invention may be any ones so long as the effects of the present invention are not impaired. The fine metal oxide particles include fine particles of titanium oxide, zirconium oxide, barium titanate, zinc oxide, lead titanate, and the like, from the viewpoint of obtaining a high refractive index, and these fine metal oxide particles can be used alone or in a combination of two or more kinds.

The fine metal oxide particles have an average particle size of preferably from 1 to 100 nm, more preferably from 1 to 50 nm, and even more preferably from 1 to 20 nm, from the viewpoint of obtaining excellent transparency even in a state where the particles are dispersed in the resin in a high concentration. The average particle size can be determined by the measurement of a particle size of particle dispersion by a dynamic light scattering method, or direct observation with a transmission electron microscope.

In the present invention, it is preferable that the fine metal oxide particles are prepared in a dispersion (also referred to as "dispersion of the fine metal oxide particles"), and a dispersion medium includes water, alcohols, ketone-based solvents, acetamide-based solvents, and the like, and it is preferable to use at least one member selected from the group consisting of water, methanol, butyl methyl ketone, and dimethylacetamide. The amount of the fine metal oxide particles (solid content) is preferably from 10 to 40% by weight, more preferably from 20 to 40% by weight, and even more preferably from 30 to 40% by weight, of the dispersion, from the viewpoint of efficiently reacting at the surface of the particles. As the dispersion of the fine metal oxide particles as described above, a commercially available product such as a dispersion of titanium oxide particles of NEOSUNVEIL or QUEEN TITANIC Series commercially available from Catalyst & Chemicals Ind. Co., Ltd. (CCIC), or Tynoc commercially available from Taki Chemical Co., Ltd.; or a dispersion of zirconium oxide particles of ZSL Series commercially available from Daiichi Kigenso Kagaku Kogyo Co., Ltd., NZD Series commercially available from Sumitomo Osaka Cement Co., Ltd., or Nano-Use Series commercially available from Nissan Chemical Industries, Ltd.; or the like can be used.

The fine metal oxide particles are used in an amount of preferably from 0.1 to 20% by weight, more preferably from 5 to 20% by weight, and even more preferably from 13 to 16% by weight, of the mixture subjected to the reaction, from the viewpoint of accomplishment of a high refractive index and reaction efficiency on the surface of the particles.

It is preferable that the bifunctional alkoxysilane is a compound represented by the formula (I):

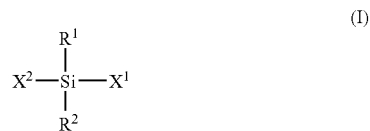

wherein each of $R^1$ and $R^2$ is independently an alkyl group or a phenyl group; and each of $X^1$ and $X^2$ is independently an alkoxy group.

Each of $R^1$ and $R^2$ in the formula (I) is independently an alkyl group or a phenyl group, and the alkyl group has the number of carbon atoms of preferably 1 to 18, more preferably from 1 to 12, and even more preferably from 1 to 6, from the viewpoint of controlling hydrophilicity/hydrophobicity of the surface of the particles, efficiency of polycondensation reaction of the alkoxysilane, and the like. Specific examples of the alkyl group include a methyl group, an ethyl group, a propyl group, an isopropyl group, and the like. Among them, it is preferable that each of $R^1$ and $R^2$ is independently a methyl group or a phenyl group.

Each of $X^1$ and $X^2$ in the formula (I) is independently an alkoxy group, and the alkoxy group has the number of carbon atoms of preferably from 1 to 4, and more preferably from 1 to 2, from the viewpoint of reactivity at the surface of the particles and a rate of hydrolysis. Specific examples of the alkoxy group include a methoxy group, an ethoxy group, and the like. Among them, it is preferable that both of $X^1$ and $X^2$ are a methoxy group.

The bifunctional alkoxysilane represented by the formula (I) includes diphenyldimethoxysilane, dimethyldimethoxysilane, dimethyldiethoxysilane, diphenyldiethoxysilane, diethyldimethoxysilane, diethyldiethoxysilane, diisopropyldimethoxysilane, diisopropyldiethoxysilane, methylphenyldimethoxysilane, methylphenyldiethoxysilane, and the like, and these bifunctional alkoxysilanes can be used alone or in a combination of two or more kinds. Among them, dimethyldimethoxysilane where both $R^1$ and $R^2$ are a methyl group, and both $X^1$ and $X^2$ are a methoxy group, and diphenyldimethoxysilane where both $R^1$ and $R^2$ are a phenyl group, and both $X^1$ and $X^2$ are a methoxy group are preferred.

The bifunctional alkoxysilane represented by the formula (I) is used in an amount of preferably from 10 to 60% by weight, more preferably from 20 to 50% by weight, and even more preferably from 20 to 30% by weight, of the mixture subjected to the reaction, from the viewpoint of accomplishment of a high refractive index, reaction efficiency at the surface of the particles, and efficiency of the polycondensation reaction of the silanes themselves.

In addition, it is preferable that the trifunctional alkoxysilane is a compound represented by the formula (II):

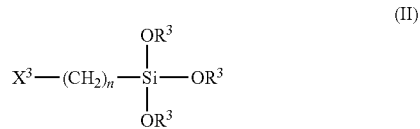

wherein $R^3$ is an alkyl group having 1 to 8 carbon atoms; $X^3$ is a monovalent organic group; and n is an integer of from 0 to 3.

$R^3$ in the formula (II) is an alkyl group, and the alkyl group has the number of carbon atoms of preferably from 1 to 8, more preferably from 1 to 6, and even more preferably from 1 to 3, from the viewpoint of reactivity at the surface of the particles. Specific examples of the alkyl group include a methyl group, an ethyl group, a propyl group, an isopropyl group, a butyl group, a pentyl group, a hexyl group, and the like. Among them, $R^3$ is preferably a methyl group or an ethyl group, and more preferably a methyl group.

$X^3$ in the formula (II) is a monovalent organic group, which can be various functional groups for giving the physical properties depending upon the applications of the silicone resin composition dispersed with the fine metal oxide particles. Specific examples of the monovalent organic group include an alkyl group, a phenyl group, a glycidyl group, a vinyl group, an epoxycyclohexyl group, an amino group, a thiol group, and the like. In addition, these groups (for example, a glycidyl group) may optionally contain other atoms, for example, an oxygen atom, or the like.

n in the formula (II) is preferably an integer of 0 to 3, from the viewpoint of solubility in a solvent.

The trifunctional alkoxysilane represented by the formula (II) includes 2-((3,4)-epoxycyclohexyl)ethyltrimethoxysilane, 3-methacryloxypropyltrimethoxysilane, 3-glycidoxypropyltrimethoxysilane, phenyltrimethoxysilane, methyltrimethoxysilane, ethyltrimethoxysilane, pfopyltrimethoxysilane, hexyltrimethoxysilane, decyltrimethoxysilane, and the like, and these trifunctional alkoxysilanes can be used alone or in a combination of two or more kinds.

The trifunctional alkoxysilane represented by the formula (II) is used in an amount of preferably from 5 to 60% by weight, more preferably from 10 to 40% by weight, and even more preferably from 20 to 40% by weight, of the mixture subjected to the reaction, from the viewpoint of controlling the physical properties of the silicone resin composition dispersed with the fine metal oxide particles.

It is preferable that the bifunctional alkoxysilane and the trifunctional alkoxysilane subjected to the reaction in the presence of the dispersion of fine metal oxide particles are contained in a molar ratio, i.e. the bifunctional alkoxysilane/the trifunctional alkoxysilane, of preferably from 90/10 to 60/40, more preferably from 80/20 to 60/40, even more preferably from 80/20 to 65/35, and even more preferably from 80/20 to 70/30, from the viewpoint of solubility in a solvent, and hardness and strength of a coating film obtained by curing the composition. In a case where the molar ratio is smaller than the above-mentioned numerical range, i.e. a case where a trifunctional alkoxysilane is contained in a larger amount, the crosslinking degree of the resin becomes too high, and the resin is less likely to be dissolved in the solvent. In addition, in a case where the molar ratio is larger than this numerical range, i.e. a case where a trifunctional alkoxysilane is contained in a smaller amount, sufficient strength of the resin is less likely to be obtained.

When subjected to the reaction in the presence of the dispersion of fine metal oxide particles, besides the above components, a component such as water, methanol, or methyl ethyl ketone may be contained, from the viewpoint of solubility of the reaction compound. The component is used in an amount of preferably from 10 to 50% by weight, and more preferably from 20 to 40% by weight, of the mixture subjected to the reaction.

In the present invention, the mixture is subjected to the reaction using the above components, and the reaction includes, for example, mixing a bifunctional alkoxysilane, a trifunctional alkoxysilane, and water, or the like, in the presence of a dispersion of fine metal oxide particles, and treating at a temperature of preferably from 20° to 80° C., and more preferably from 40° to 60° C., for preferably 1 to 6 hours, more preferably 2 to 6 hours, and more preferably 2 to 4 hours while stirring, without being limited thereto.

In addition, after the reaction, the reaction mixture is cooled to room temperature, and the solvent is distilled off, whereby a silicone resin composition can be obtained.

Therefore, the present invention also provides a method for producing a silicone resin composition, including the step of reacting a bifunctional alkoxysilane and a trifunctional alkoxysilane in the presence of a dispersion of fine metal oxide particles.

The silicone resin composition thus obtained, when subjected to structural analysis by NMR, has an intensive singlet peak ascribed to a methyl moiety of a dimethylsilyl group appearing near δ0 (ppm), and a triplet peak ascribed to a methylene moiety at an α-position of Si atom of a trifunctional silane appearing near δ0.6 (ppm). In addition, a peak peculiar to an unreacted alkoxy group (in a case of a methoxy group, near δ3.3 (ppm)) appears Further, it is preferable that the viscosity (25° C.) of the resin composition is, for example, from 100 to 2000 mPa·s.

The resin composition may be used in the form of a solution (a silicone resin composition solution) prepared by, for example, dissolving the resin composition in a mixed solvent of methanol/tetrahydrofuran, and the resin composition can be used in an amount of preferably from 10 to 50% by weight, and more preferably from 20 to 50% by weight, of the mixed solvent, from the viewpoint controlling the film thickness upon coating. It is preferable that using the resin composition solution, a film is molded into a thickness of preferably from 3 to 100 μm, and more preferably from 10 to 50 μm.

The film molded by using the silicone resin composition in the present invention has transmittance of preferably 80% or more, more preferably 90% or more, and even more preferably 95% or more, from the viewpoint of light-extracting efficiency. The transmittance can be determined in the manner as described in Examples set forth below.

Similarly, the film molded by using the silicone resin composition in the present invention has haze of preferably from 0 to 10%, more preferably from 0 to 1.0%, and even more preferably from 0 to 0.5%, from the viewpoint of light-extracting efficiency. The haze can be determined in the manner as described in Examples set forth below.

The film molded by using the silicone resin composition in the present invention has a refractive index of preferably 1.43 or more, more preferably 1.45 or more, and even more preferably 1.48 or more, from the viewpoint of light-extracting efficiency. The refractive index can be determined by using an Abbe refractometer.

Since the silicone resin composition of the present invention has a high refractive index and high transparency, the composition is usable for microlenses, optical filters, antireflection films, optical waveguides, optical films, and the like, and the composition is especially suitably used for, for example, photosemiconductor devices mounted with blue or white LED elements (backlights for liquid crystal displays, traffic lights, outdoor big displays, advertisement sign boards, and the like). The present invention also provides a photosemiconductor device containing a photosemiconductor element encapsulated with the resin composition. Since the photosemiconductor element is encapsulated with the resin composition (also hereinafter referred to as "a resin composition for encapsulating photosemiconductor elements"), the photosemiconductor device can be provided with excellent light-extracting efficiency.

The photosemiconductor device of the present invention can be produced by encapsulating, for example, LED elements with the above-mentioned resin composition for encapsulating photosemiconductor elements. Specifically, a photosemiconductor device can be produced by directly applying a silicone resin composition (solution) of the present invention to a substrate mounted with LED elements according to any methods such as casting, spin-coating or roll-coating in an appropriate thickness, and heating and drying the coating to a temperature of preferably from 50° to 150° C. for preferably 1 to 3 hours, thereby encapsulating the photosemiconductor elements.

EXAMPLES

The following examples further describe and demonstrate embodiments of the present invention. The examples are given solely for the purposes of illustration and are not to be construed as limitations of the present invention.

Example 1

In a container equipped with a stirrer, a reflux condenser, and a nitrogen inlet tube, 3.0 g of a methanol dispersion of fine anatase-type titanium oxide particles having an average particle size of 15 nm (trade name: ELCOM NT-1089TIV, commercially available from Catalyst & Chemicals Ind. Co., Ltd., solid content: 30.4% by weight), 0.7 g of water, 1.8 g (15 mmol) of a bifunctional alkoxysilane dimethyldimethoxysilane (KBM22, commercially available from Shin-Etsu Silicone), and 1.5 g (6 mmol) of a trifunctional alkoxysilane 2-((3,4)-epoxycyclohexyl)ethyltrimethoxysilane (KBM303, commercially available from Shin-Etsu Silicone) [bifunctional alkoxysilane/trifunctional alkoxysilane (molar ratio)=15/6] were mixed together, and the mixture was heated to 60° C. while stirring for 6 hours to carry out the reaction. Thereafter, the resulting mixture was cooled to room temperature, and the solvents were distilled off, to give a resin composition for encapsulating photosemiconductor elements.

In addition, a solution prepared by dissolving the resin composition in a mixed solvent of methanol/tetrahydrofuran (1/1) in an amount of 30% by weight was applied to a glass plate so as to have a film thickness of 10 μm, and an applied coating was heated at 150° C. for 1 hour. The resulting film had a transmittance at 450 nm of 99.9% and a haze of 0.2%. The refractive index of the resulting film was determined with an Abbe refractometer. As a result, the refractive index was 1.526.

Further, a solution of the resin composition was applied with an applicator to a substrate mounted with blue light-emitting diodes, and heated at 150° C. for 1 hour, thereby encapsulating the blue light-emitting diodes, to give a blue light-emitting diode device.

Example 2

The same procedures as in Example 1 were carried out except that 1.5 g (6 mmol) of 3-methacryloxypropyltrimethoxysilane (KBM503, commercially available from Shin-Etsu Silicone) was used as a trifunctional alkoxysilane [bifunctional alkoxysilane/trifunctional alkoxysilane (molar ratio)=15/6], to give a resin composition for encapsulating photosemiconductor elements.

In addition, a film obtained in the same manner as in Example 1 had a transmittance of 99.8%, a haze of 0.7%, and a refractive index of 1.522. Further, blue light-emitting diodes were encapsulated in the same manner as in Example 1, to give a blue light-emitting diode device.

Example 3

The same procedures as in Example 1 were carried out except that 1.7 g (7 mmol) of 3-glycidoxypropyltrimethoxysilane (KBM403, commercially available from Shin-Etsu Silicone) was used as a trifunctional alkoxysilane [bifunctional alkoxysilane/trifunctional alkoxysilane (molar ratio)=15/7], to give a resin composition for encapsulating photosemiconductor elements.

In addition, a film obtained in the same manner as in Example 1 had a transmittance of 99.8%, a haze of 0.2%, and a refractive index of 1.508. Further, blue light-emitting diodes were encapsulated in the same manner as in Example 1, to give a blue light-emitting diode device.

Example 4

The same procedures as in Example 1 were carried out except that 1.2 g (6 mmol) of phenyltrimethoxysilane (KBM103, commercially available from Shin-Etsu Silicone) was used as a trifunctional alkoxysilane [bifunctional alkoxysilane/trifunctional alkoxysilane (molar ratio)=15/6], to give a resin composition for encapsulating photosemiconductor elements.

In addition, a film obtained in the same manner as in Example 1 had a transmittance of 99.8%, a haze of 0.5%, and a refractive index of 1.539. Further, blue light-emitting diodes were encapsulated in the same manner as in Example 1, to give a blue light-emitting diode device.

Example 5

The same procedures as in Example 1 were carried out except that 0.8 g (6 mmol) of methyltrimethoxysilane (KBM13, commercially available from Shin-Etsu Silicone) was used as a trifunctional alkoxysilane [bifunctional alkoxysilane/trifunctional alkoxysilane (molar ratio)=15/6], to give a resin composition for encapsulating photosemiconductor elements.

In addition, a film obtained in the same manner as in Example 1 had a transmittance of 99.9%, a haze of 0.3%, and a refractive index of 1.595. Further, blue light-emitting diodes were encapsulated in the same manner as in Example 1, to give a blue light-emitting diode device.

Example 6

The same procedures as in Example 1 were carried out except that 0.9 g (6 mmol) of ethyltrimethoxysilane (LS2410, commercially available from Shin-Etsu Silicone) was used as a trifunctional alkoxysilane [bifunctional alkoxysilane/trifunctional alkoxysilane (molar ratio)=15/6], to give a resin composition for encapsulating photosemiconductor elements.

In addition, a film obtained in the same manner as in Example 1 had a transmittance of 99.1%, a haze of 0.2%, and a refractive index of 1.525. Further, blue light-emitting diodes were encapsulated in the same manner as in Example 1, to give a blue light-emitting diode device.

Example 7

The same procedures as in Example 1 were carried out except that 0.99 g (6 mmol) of propyltrimethoxysilane (LS3120, commercially available from Shin-Etsu Silicone) was used as a trifunctional alkoxysilane [bifunctional alkoxysilane/trifunctional alkoxysilane (molar ratio)=15/6], to give a resin composition for encapsulating photosemiconductor elements.

In addition, a film obtained in the same manner as in Example 1 had a transmittance of 98.9%, a haze of 0.3%, and a refractive index of 1.530. Further, blue light-emitting diodes were encapsulated in the same manner as in Example 1, to give a blue light-emitting diode device.

Example 8

The same procedures as in Example 1 were carried out except that 1.24 g (6 mmol) of hexyltrimethoxysilane (KBM3063, commercially available from Shin-Etsu Silicone) was used as a trifunctional alkoxysilane [bifunctional alkoxysilane/trifunctional alkoxysilane (molar ratio)=15/6], to give a resin composition for encapsulating photosemiconductor elements.

In addition, a film obtained in the same manner as in Example 1 had a transmittance of 98.8%, a haze of 0.3%, and a refractive index of 1.514. Further, blue light-emitting diodes were encapsulated in the same manner as in Example 1, to give a blue light-emitting diode device.

Example 9

The same procedures as in Example 1 were carried out except that 1.24 g (6 mmol) of decyltrimethoxysilane (KBM3103, commercially available from Shin-Etsu Silicone) was used as a trifunctional alkoxysilane [bifunctional alkoxysilane/trifunctional alkoxysilane (molar ratio)=15/6], to give a resin composition for encapsulating photosemiconductor elements.

In addition, a film obtained in the same manner as in Example 1 had a transmittance of 92.2%, a haze of 1.3%, and a refractive index of 1.508. Further, blue light-emitting diodes were encapsulated in the same manner as in Example 1, to give a blue light-emitting diode device.

Example 10

In a container equipped with a stirrer, a reflux condenser, and a nitrogen inlet tube, 3.0 g of a methanol dispersion of fine anatase-type titanium oxide particles having an average particle size of 15 nm (trade name: ELCOM NT-1089TIV, commercially available from Catalyst & Chemicals Ind. Co., Ltd., solid content: 30.4% by weight), 5 g of methanol, 5 g of methyl ethyl ketone, 0.7 g of water, 7.67 g (15 mmol) of a bifunctional alkoxysilane diphenyldimethoxysilane (KBM202SS, commercially available from Shin-Etsu Silicone), and 1.19 g (6 mmol) of a trifunctional alkoxysilane phenyltrimethoxysilane (KBM103, commercially available from Shin-Etsu Silicone) [bifunctional alkoxysilane/trifunctional alkoxysilane (molar ratio)=15/6] were mixed together, and the mixture was heated to 60° C. while stirring for 6 hours to carry out the reaction. After the termination of the reaction, the resulting mixture was cooled to room temperature, and the solvents were distilled off, to give a resin composition for encapsulating photosemiconductor elements. ($^1$H-NMR could not be determined because when the resin composition was dissolved in $D_6$-DMSO, the particles were aggregated.)

In addition, a film obtained in the same manner as in Example 1 had a transmittance of 95%, a haze of 1.1%, and a refractive index of 1.571. Further, blue light-emitting diodes were encapsulated in the same manner as in Example 1, to give a blue light-emitting diode device.

Example 11

The same procedures as in Example 1 were carried out except that 3.0 g of a methyl butyl ketone dispersion (trade name: TV-1499, commercially available from Catalyst & Chemical Ind. Co., Ltd., solid content: 30.5% by weight) was used as a dispersion of fine titanium oxide particles, to give a resin composition for encapsulating photosemiconductor elements.

In addition, a film obtained in the same manner as in Example 1 had a transmittance of 99.8%, a haze of 0.7%, and a refractive index of 1.519. Further, blue light-emitting diodes were encapsulated in the same manner as in Example 1, to give a blue light-emitting diode device.

Example 12

The same procedures as in Example 1 were carried out except that 3.0 g of a dimethylacetamide dispersion (trade name: TV-1500, commercially available from Catalyst & Chemical Ind. Co., Ltd., solid content: 30.1% by weight) was used as a dispersion of fine titanium oxide particles, to give a resin composition for encapsulating photosemiconductor elements.

In addition, a film obtained in the same manner as in Example 1 had a transmittance of 99.8%, a haze of 0.7%, and a refractive index of 1.516. Further, blue light-emitting diodes were encapsulated in the same manner as in Example 1, to give a blue light-emitting diode device.

Example 13

The same procedures as in Example 1 were carried out except that 3.0 g of an aqueous dispersion of fine zirconium oxide particles having an average particle size of 7 nm (trade name: NZD-3005, commercially available from Sumitomo Osaka Cement Co., Ltd., solid content: 30% by weight) was used in place of the dispersion of fine titanium oxide particles, to give a resin composition for encapsulating photosemiconductor elements.

In addition, a film obtained in the same manner as in Example 1 had a transmittance of 99.9%, a haze of 0.1%, and a refractive index of 1.492. Further, blue light-emitting diodes were encapsulated in the same manner as in Example 1, to give a blue light-emitting diode device.

Comparative Example 1

In a container equipped with a stirrer, a reflux condenser, and a nitrogen inlet tube, 1.5 g of methanol, 1.5 g of water, 1.8 g (15 mmol) of a bifunctional alkoxysilane dimethyldimethoxysilane (KBM22, commercially available from Shin-Etsu Silicone), and 1.5 g (6 mmol) of a trifunctional alkoxysilane 2-((3,4)-epoxycyclohexyl)ethyltrimethoxysilane (KBM303, commercially available from Shin-Etsu Silicone) were mixed together, and the mixture was heated to 60° C. while stirring for 6 hours to synthesize the silicone resin. Thereafter, the dispersion of fine titanium oxide particles used in Example 1 was added to the solution of the silicone resin. As a result, the fine titanium oxide particles were aggregated, and the mixture became white turbid, so that a resin composition for encapsulating photosemiconductor elements could not be obtained.

Comparative Example 2

The reaction was carried out under the same conditions as in Example 1, except that 4.5 g (15 mmol) of a disilanol-modified silicone having silanol groups at both ends (X-21-3178, commercially available from Shin-Etsu Silicone) was added in place of the bifunctional alkoxysilane. During the reaction, the fine titanium oxide particles were aggregated, and the mixture became white turbid, and could not be re-dispersed.

<Evaluation>

The transmittance, the haze, and the refractive index mentioned above were evaluated by the following methods.

(Transmittance)

The transmittance was determined with a spectrophotometer (U-4100, commercially available from Hitachi High-Technologies Corporation), at a wave length of 450 nm.

(Haze)

The haze was determined by measuring a sample (film) coated on a glass plate with a haze and reflectometer (HR-100, commercially available from MURAKAMI COLOR RESEARCH LABORATORY).

(Refractive Index)

The refractive index was determined with an Abbe refractometer (Model NAR-1T, commercially available from ATAGO CO., LTD.) at 25° C.

From the above results, in Examples 1 to 13 the fine metal oxide particles are dispersed without being aggregated, showing high refractive indices, and high transmittance and low haze (i.e. high transparency), as compared to those of Comparative Examples 1 and 2. Therefore, in the case where of encapsulating with the silicone resin composition of the present invention, the fine metal oxide particles are stably dispersed, and the film formed has a high refractive index and high transparency.

The silicone resin composition of the present invention is suitably used in backlights for liquid crystal displays, traffic lights, outdoor big displays, advertisement sign boards, and the like.

What is claimed is:

1. A photosemiconductor device comprising a photosemiconductor element encapsulated with a silicone resin composition obtained by carrying out a reaction between only a bifunctional alkoxysilane and a trifunctional alkoxysilane in the presence of a dispersion of titanium oxide or zirconium oxide particles having an average particle size of from 1 to 100 nm, wherein the molar ratio of the bifunctional alkoxysilane to the trifunctional alkoxysilane ranges from 90:10 to 65:35.

2. The photosemiconductor device according to claim 1, wherein the bifunctional alkoxysilane is a compound represented by the formula (I):

wherein each of $R^1$ and $R^2$ is independently an alkyl group or a phenyl group; and each of $X^1$ and $X^2$ is independently an alkoxy group.

3. The photosemiconductor device according to claim 1, wherein the trifunctional alkoxysilane is a compound represented by the formula (II):

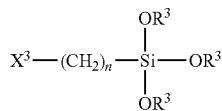 (II)

wherein $R^3$ is an alkyl group having 1 to 8 carbon atoms; $X^3$ is a monovalent organic group; and n is an integer of from 0 to 3.

4. The photosemiconductor device according to claim 1, wherein the bifunctional alkoxysilane is a compound represented by the formula (I):

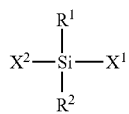 (I)

wherein each of $R^1$ and $R^2$ is independently an alkyl group or a phenyl group; and each of $X^1$ and $X^2$ is independently an alkoxy group, and wherein the trifunctional alkoxysilane is a compound represented by the formula (II):

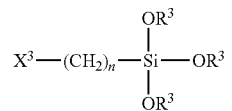 (II)

wherein $R^3$ is an alkyl group having 1 to 8 carbon atoms; $X^3$ is a monovalent organic group; and n is an integer of from 0 to 3.

5. A method of making the photosemiconductor device of claim 1 which comprises:
  directly applying a solution comprising said silicone resin composition to a substrate mounted with a photosemiconductor element by casting, spin-coating, or roll-coating, and
  heating and drying the coating to a temperature of from 50 to 150° C. for from 1 to 3 hours,
  thereby encapsulating the photosemiconductor element.

6. The method of claim 5, wherein said photosemiconductor element is an LED elements.

* * * * *